United States Patent
Kornfeld et al.

(10) Patent No.: US 6,803,705 B2
(45) Date of Patent: Oct. 12, 2004

(54) PLASMA ACCELERATOR ARRANGEMENT

(75) Inventors: Günter Kornfeld, Elchingen (DE); Werner Schwertfeger, Blaubeuren (DE)

(73) Assignee: Thales Electron Devices GmbH, Ulm (DE)

(*) Notice: Subject to any disclaimer, the term of this patent is extended or adjusted under 35 U.S.C. 154(b) by 197 days.

(21) Appl. No.: 10/239,272
(22) PCT Filed: Mar. 22, 2001
(86) PCT No.: PCT/DE01/01106
§ 371 (c)(1),
(2), (4) Date: Sep. 20, 2002
(87) PCT Pub. No.: WO01/71185
PCT Pub. Date: Sep. 27, 2001

(65) Prior Publication Data
US 2003/0048053 A1 Mar. 13, 2003

(51) Int. Cl.⁷ .............................. H05H 1/50; F03H 1/00
(52) U.S. Cl. ................. 313/231.31; 313/161; 315/5.38; 315/506
(58) Field of Search ................. 313/231.31, 231.61, 313/362.1, 160, 161; 315/5.31, 5.38, 501, 505, 506

(56) References Cited

U.S. PATENT DOCUMENTS

| | | | | |
|---|---|---|---|---|
| 2,617,026 A | * | 11/1952 | Bierman | ...... 315/504 |
| 3,270,236 A | | 8/1966 | Alfred et al. | |
| 3,461,033 A | | 8/1969 | Alfred et al. | |
| 3,626,305 A | * | 12/1971 | Furth et al. | ...... 315/500 |
| 3,719,893 A | * | 3/1973 | dePackh | ...... 315/500 |
| 5,838,120 A | * | 11/1998 | Semenkin et al. | ...... 315/505 |
| 5,847,493 A | | 12/1998 | Baranov et al. | |

FOREIGN PATENT DOCUMENTS

| | | |
|---|---|---|
| DE | 12 22 589 | 8/1966 |
| DE | 43 02 630 | 5/1994 |
| DE | 198 28 704 | 12/1999 |
| EP | 0 541 309 | 5/1993 |
| WO | WO 01/72093 | 9/2001 |

* cited by examiner

Primary Examiner—Ashok Patel
(74) Attorney, Agent, or Firm—Collard & Roe, P.C.

(57) ABSTRACT

For a plasma accelerator arrangement having a toroidal plasma chamber, a novel structure of the magnetic and/or electric fields is proposed which, in particular, permits multi-stage embodiments with substantially improved efficiency.

8 Claims, 2 Drawing Sheets

PLASMA ACCELERATOR ARRANGEMENT

The invention relates to a plasma accelerator arrangement.

Plasma accelerator arrangements are known, in particular, in the form of what are known as Hall arrangements. Here, an ionizable gas, in particular a noble gas, is fed to a plasma chamber. The plasma chamber is essentially annular around a central longitudinal axis and is open in a main expulsion direction parallel to the longitudinal axis. Arranged at the foot of the plasma chamber, opposite to the expulsion direction, is an anode. A cathode, as electron source, is arranged outside the plasma chamber, offset radially with respect thereto. The walls of the plasma chamber consist of nonconductive material. A magnetic system produces in the plasma chamber a substantially radially oriented magnetic field by means of a first, inner and a second, outer magnetic pole. An electron stream emitted by the cathode is accelerated in the electric field between cathode and anode and fed to the plasma chamber and, in the plasma chamber, is deflected at right angles to the electric potential gradient and at right angles to the magnetic field lines by the radial magnetic field, and ionizes the propellant gas in the chamber. From the plasma formed in the process, the positively charged ions are accelerated in the expulsion direction. Some of the electrons emitted by the cathode are used to neutralize the ion beam.

An arrangement of this type, in which a special magnetic field design is intended to increase the efficiency and the lifetime, is known, for example, from EP 0 541 309 A1. Via oppositely polarized magnetic pole shoes, opposite and spaced apart radially from each other in the expulsion area of the annular plasma chamber, an inner and an outer coil system effect a substantially radial magnetic field in this area of the plasma chamber. The deeper area of the plasma chamber, with the annular electrode, is surrounded by a magnetic shield.

U.S. Pat. No. 5,847,493 A shows a plasma accelerator based on the Hall effect, in which an inner and an outer coil arrangement in each case produce two magnetic poles spaced apart in the expulsion direction, the respectively radially opposite poles of the inner and outer coil arrangement being oppositely polarized and in turn producing the substantially radial magnetic field. A similar plasma accelerator arrangement with partially conically shaped pole shoes is described in EP 0 982 976 A1.

DE 198 28 704 A1 describes a plasma accelerator arrangement in which, into a circularly cylindrical plasma chamber, a focused electron beam accelerated outside the chamber is introduced on the longitudinal axis and is guided on the axis by a permanent periodic magnet arrangement surrounding the plasma chamber cylindrically and having alternately aligned stages.

It is an object of the present invention to specify an advantageous plasma accelerator arrangement, in particular as a drive source for spacecraft.

The invention is described in patent claim 1. The dependent claims contain advantageous refinements and developments of the invention.

A significant aspect of the present invention is the fundamentally different configuration of the magnetic field which penetrates the plasma chamber, as compared with known arrangements. While, in the known arrangements, the magnetic system having a pole system on the inside and having a second pole system on the outside with respect to the toroidal plasma chamber, is substantially radially aligned and frequently closed via a magnetic return path behind the plasma chamber, the invention proposes a magnetic system which comprises, both radially on the inside and radially on the outside with respect to the plasma chamber, a magnet arrangement having a pole change in the longitudinal direction, that is to say in a direction parallel to the longitudinal axis of the arrangement. In particular, in a preferred arrangement, the pole changes of the outer and inner magnet arrangement can take place in the same direction, so that identical magnetic poles separated radially by the plasma chamber and belonging to the two separate magnet arrangements are opposite one another.

In a first embodiment, the magnetic system can be designed in one stage, in each case with a pole change for the outer and the inner magnetic system by means of opposite magnetic poles spaced apart in the longitudinal direction. At least one of the two magnetic poles in each case is located in the longitudinal direction in the area of the plasma chamber. Both poles of the single-stage magnetic system, spaced apart in the longitudinal direction, are preferably located within the longitudinal extent of the plasma chamber. Particularly advantageous is an arrangement in which the magnetic system is of multi-stage design with a plurality of successive subsystems in the longitudinal direction, each of which has an outer and an inner magnet arrangement and in which the successive subsystems in the longitudinal direction are alternately aligned in opposite directions. The radially opposite poles preferably have the same direction, which results in a particularly advantageous distribution of the electron drift.

Particularly beneficial is a plasma accelerator arrangement according to the invention in which there is still at least one electrode arrangement between the cathode and the anode in the area of the side walls of the plasma chamber, which arrangement is at an intermediate potential between cathode potential and anode potential. On such an electrode, electrons which have merely picked up energy from part of the potential difference between cathode and anode can be intercepted. The potential difference between cathode and anode can as a result be subdivided into two or more acceleration stages. Losses as a result of electron-wall collisions can be reduced substantially as a result. In particular, the electrical efficiency increases monotonically with the number of potential stages. The electrodes in the longitudinal direction are advantageously in each case placed between the pole ends of a magnetic system or magnetic subsystem. This results in a particularly beneficial course of electrical and magnetic fields.

The invention is explained in more detail below using preferred exemplary embodiments and with reference to the figures, in which.

In plasma physics, it is known that because of the high mobility of the electrons, caused by their low mass as compared with the generally positively charged ions, the plasma behaves similarly to a metallic conductor and assumes a constant potential.

However, if a plasma is located between two electrodes at different potentials, then the plasma assumes approximately the potential of the electrode with the potential that is higher for the positive ions (anode) since the electrons move very rapidly toward the anode until the potential of the plasma is at the approximately constant potential of the anode, and the plasma is therefore field-free. Only in a comparatively thin boundary layer at the cathode does the potential drop sharply in the cathode drop, as it is known.

In a plasma, therefore, different potentials can be maintained only if the conductivity of the plasma is not isotropic. Advantageous, high anisotropy of the conductivity may be produced in a beneficial way in the arrangement according to the invention. Since, because of the Lorentz force, during a movement transversely with respect to magnetic field lines, electrons experience a force at right angles to the magnetic field lines and at right angles to the direction of movement, although electrons can be displaced easily in the direction of the magnetic field lines, that is to say in the direction of the magnetic field lines, there is a high electrical conductivity, and a potential gradient in this direction is easily balanced out. Acceleration of the electrons by an electric field component at right angles to the magnetic field lines counteracts the aforementioned Lorentz force, however, so that the electrons move spirally around the magnetic field lines. Accordingly, at right angles to the magnetic field lines, electric fields may be produced without immediate compensation by electron flow. For the stability of such electric fields, it is particularly beneficial if the associated electric equipotential surfaces extend approximately parallel to the magnetic field lines, and therefore electric and magnetic fields are substantially crossed.

Figure 1:
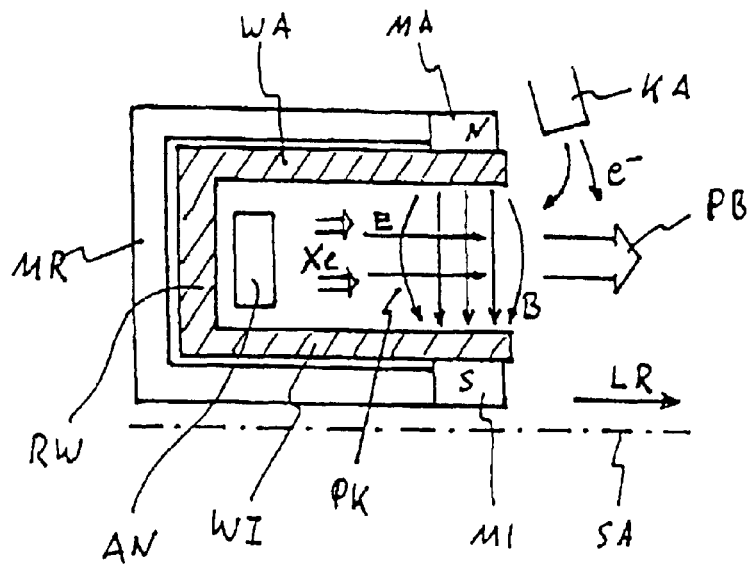
FIG. 1 shows a known plasma chamber in side view.

In FIG. 1, the basic structure of a conventional plasma accelerator based on the Hall principle, (Hall thruster) is sketched. A plasma chamber PK is designed toroidally around a central axis of symmetry SA and has insulating side walls WA, WI and a rear wall RW. The plasma chamber is open on one side in a longitudinal direction LR parallel to the axis of symmetry SA and, at this point, can also have an acceleration grid.

Outside the plasma chamber, a cathode KA is arranged as an electron source. An anode AN is arranged at the foot end of the plasma chamber, facing away from the expulsion opening AU. An electric field E between anode and cathode runs within the plasma chamber, substantially parallel to the longitudinal direction LR. A magnetic system has a radially outer first magnetic pole MA (for example a north pole) and a second radially inner magnetic pole MI (for example a south pole). The two magnetic poles are designed to be substantially annularly symmetrical to the axis of symmetry SA and are connected via a magnetic return path MR behind the plasma chamber. The magnetic system produces a substantially radially oriented magnetic field B in the plasma chamber PK.

Some of the electrons emitted by the cathode are accelerated in the electric field between anode and cathode and led into the plasma chamber and there are deflected by the magnetic field B at right angles to the direction of movement of the electrons and at right angles to the magnetic field lines, that is to say substantially at right angles to the plane of the drawing in the sketch. As a result of the drift movement of the electrons, forced in this way, about the axis of symmetry, these electrons remain in the plasma chamber over a relatively long time before they arrive at the anode AN. During the movement within the plasma chamber, the electrons produce positive ions and secondary electrons as a result of collisions with gas introduced into the plasma chamber, for example xenon. The ions and electrons form a highly conductive plasma in the plasma chamber. The ions are expelled from the chamber in the longitudinal direction. In order to avoid charging of the arrangement, electrons from the cathode KA are added to the expelled ion stream, so that the expelled plasma stream PB is electrically neutral. Such an arrangement is known per se in various embodiments.

Figure 2:
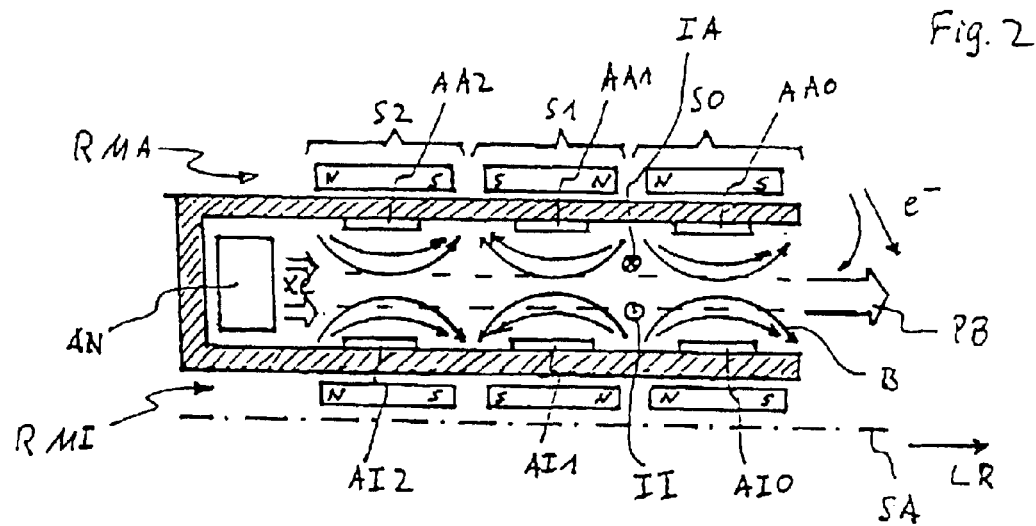
FIG. 2 shows field courses and currents in a plasma chamber according to the invention.

FIG. 2 shows a multi-stage arrangement according to the present invention, in which again, in a substantially toroidal plasma chamber, whose form is accessible in individual variations, an anode is arranged by a rear wall facing away from the expulsion direction. The significant factor in the arrangement according to FIG. 2 is that the magnetic system no longer comprises an outer and an inner pole, which are connected by a magnetic return path, but that, with respect to the plasma chamber, on the outside is a magnet arrangement RMA which, in each of the successive stages S0, S1, S2 in the longitudinal direction parallel to the axis of symmetry, intrinsically comprises both opposite magnetic poles spaced apart in the longitudinal direction LR. In the same way, a further multi-stage magnet arrangement RMI is arranged radially on the inside with respect to the plasma chamber, which again in each stage comprises intrinsically both magnetic poles spaced apart in the longitudinal direction LR. The two magnet arrangements RMA and RMI of each stage are radially opposite each other with substantially the same extent in the longitudinal direction LR. The two magnet arrangements are aligned with the same alignment, that is to say the same sequence of poles in the longitudinal direction LR. As a result, identical poles (N-N and S-S) are radially opposite each other and the magnetic fields are intrinsically closed for each of the two magnet arrangements. The course of the magnetic fields from radially opposite magnet arrangements RMA and RMI can, as a result, be viewed as separated by a center surface located substantially in the center of the plasma chamber. The magnetic field lines extend in a curved shape between the magnetic poles of each arrangement without passing through this central surface, which is not necessarily planar. Therefore, substantially only the magnetic field from one of the two magnet arrangements RMA or RMI acts on each radial side of such a central surface.

A significant difference from the arrangement according to FIG. 2 is that the magnetic field in the plasma chamber does not run substantially monotonically between two opposite poles; instead the magnetic field lines on the same radial side of the central surface in the toroidal plasma chamber are closed.

Figure 4:
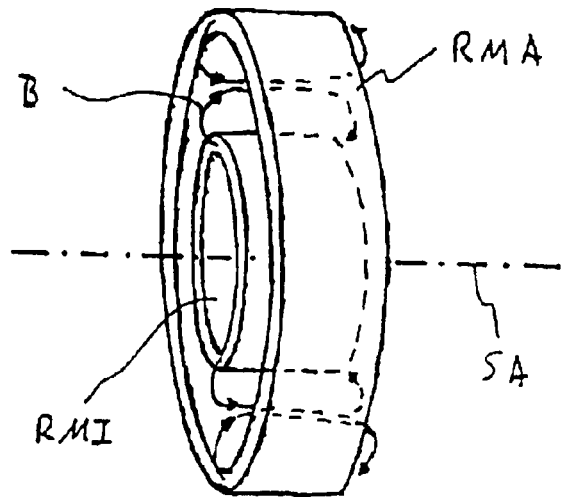
FIG. 4 shows one stage in a magnet arrangement.

The above embodiments also apply to a magnetic system having only a single inner and outer stage. Such a single magnetic stage may be formed, for example, by two concentric annular permanent magnets with poles spaced apart substantially parallel to the axis of symmetry SA. Such an arrangement is sketched in isolation in FIG. 4.

Preference is given to an embodiment of the invention according to FIG. 2, in which two or more such arrangements are arranged one behind another in the longitudinal direction LR, the pole alignment of successive magnet arrangements being opposite, with the result that the opposite poles of successive magnet arrangements in the longitudinal direction are of the same type, and therefore no magnetic field short circuit occurs, and the design [lacuna] above-described field courses remains substantially maintained for all the successive stages.

The successive magnetic fields firstly have a focusing effect on the primary electrons emitted by the cathode and fed into the plasma chamber and, secondly, prevent the outflow of secondary electrons produced in the plasma chamber from one stage to the next.

A plasma accelerator arrangement is preferred in which, in addition to cathode and anode, at least one further electrode is also provided, which is at an intermediate potential lying between cathode potential and anode potential. Such an intermediate electrode is advantageously arranged on at least one side wall, preferably in the form of two part electrodes opposite each other on the inner and outer side wall of the plasma chamber. It is beneficial in particular to position the electrode in its position between two magnetic poles in the longitudinal direction. In the arrangement according to FIG. 2, a plurality of stages S0, S1, S2 in the longitudinal direction are provided with a magnetic subsystem in each case and an electrode system in each case. The magnetic subsystems in each case comprise an inner and an outer magnetic ring, as already described and sketched in FIG. 4. The part electrode systems in the successive stages S0, S1, S2 each comprise an outer electrode ring AA0, AA1, AA2 and, radially opposite, an inner electrode ring AI0, AI1, AI2, the extent of the electrodes in the longitudinal direction being substantially the same for the outer and the inner rings. The mutually opposite electrode rings of each subsystem, that is to say AA0 and AI0 and AA1 and AI1 and AA2 and AI2 are in each case at the same potential, it being possible in particular for the electrodes AA0 and AI0 to be at ground potential of the entire arrangement. The electric fields produced by the electrodes run approximately at right angles to the magnetic field lines, in regions which are important for the formation of the plasma. In particular in the region of the highest potential gradient between the electrodes of successive stages, the magnetic and electric field lines extend substantially in a crossed manner, so that the secondary electrons produced along the path of the primary electrons cannot cause any direct short circuit of the electrodes. Since the secondary electrons can move only along the magnetic field lines of the substantially toroidal multi-stage magnetic system, the plasma jet produced remains substantially limited to the cylindrical layer volume of the focused primary electrons. There are bulges of the plasma substantially only in the region of the sign change of the axial magnetic field component, where the magnetic field points substantially radially toward the poles of the magnet arrangements.

In the arrangement sketched, the result is plasma concentrations in the longitudinal direction in positions between successive electrodes which, at the same time, coincide with the pole points of the successive magnet arrangements. With the arrangement sketched in FIG. 2, the plasma in the individual successive stages can advantageously be connected to the stage-by-stage different potentials of the successive electrodes. For this purpose, in particular the electrodes and the magnet arrangements in the longitudinal direction are arranged in such a way that the physical phase angles of the quasi-periodic magnetic field, as compared with the likewise quasi-periodic electric field, measured between the absolute minimum of the axial magnetic field with respect to the electrode center is displaced by a maximum of +/−45°, in particular a maximum of +/−15°. In this case, contact between the magnetic field lines and the electrode arranged on the side wall of the plasma chamber can be achieved and, as a result of the easy displaceability of the electrons along the magnetic field lines, the plasma potential can be set to the electrode potential of this stage. The plasma concentrations of various successive stages are therefore at different potentials.

Figure 3:
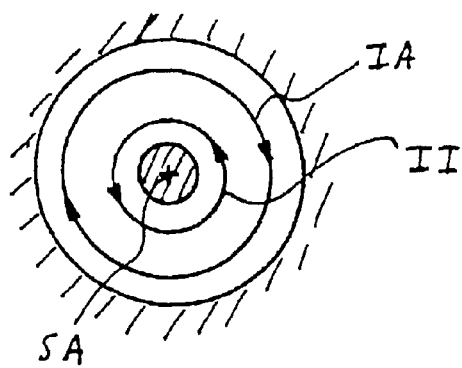
FIG. 3 shows a view in the direction of the axis of symmetry relating to FIG. 2.

The location of the highest potential gradient in the axial direction is therefore in a plasma layer which is identified by the radial magnetic field curves which have an electrically insulating effect in the axial direction. At these points, the acceleration of the positive ions takes place substantially in the longitudinal direction. Since there are sufficient secondary electrons which, as Hall currents on closed drift paths, cross in the toroidal structure, a substantially neutral plasma is accelerated in the longitudinal direction toward the expulsion opening of the plasma chamber. In the process, in one layer plane at a specific position in the longitudinal direction LR of the arrangement, there are opposite annular Hall currents II and IA at different radii, as sketched in FIG. 2 and FIG. 3.

The aforementioned beneficial phase shift of the quasi-periodic magnetic and electric structures may be achieved firstly by means of an arrangement according to FIG. 2, with the aforementioned permissible displacement of the electrodes with respect to the position sketched there by the aforementioned maximum of +/−45°, in particular a maximum of +/−15°. An alternative variant is sketched in FIG. 5, where the periodic length of the electrode stages $Aa_i$, $AA_{i+1}$ and $AI_i$, $AI_{i+1}$ is twice as great as the periodic ranks of successive magnetic ring arrangements. Such an arrangement can also be subdivided into stages which have a length twice as long as those in FIG. 2 and which then in each case contain two opposite magnetic subsystems and an electrode system.

Figure 5:
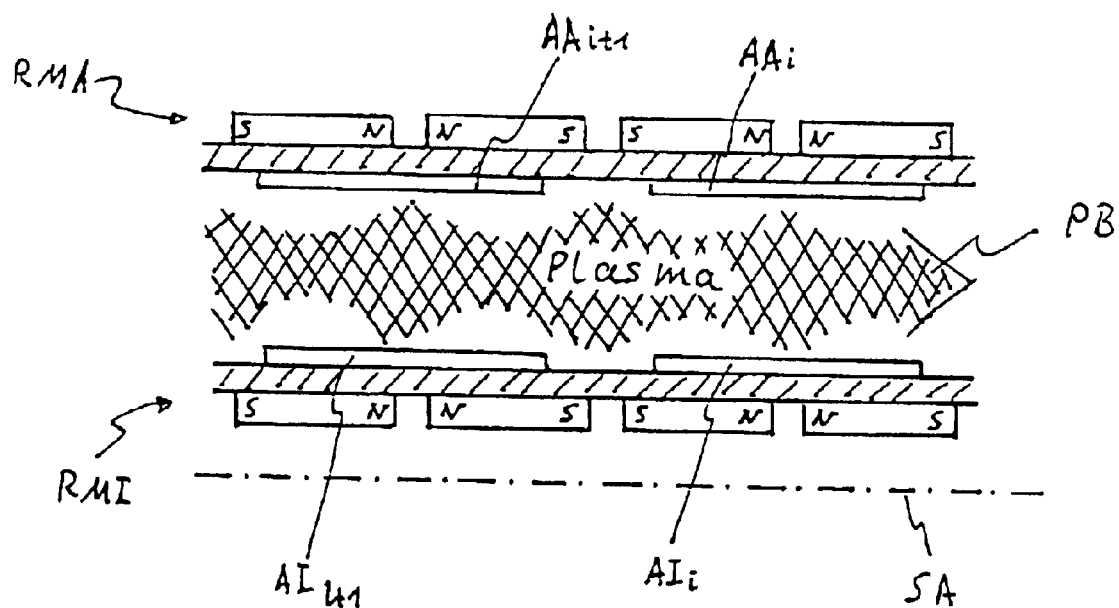
FIG. 5 shows a preferred structure in side view.

In the arrangement sketched in FIG. 5, in regions where the electrodes bridge the pole points of successive magnetic subsystems, contact zones are produced, at which the secondary electrons following the magnetic lines are picked up by the electrodes and therefore a contact zone is formed between the plasma and an electrode, whereas at pole points which are at the same time located between two successive electrodes in the longitudinal direction, an isolation zone with a high potential gradient is produced in the plasma.

In another embodiment of a magnetic system which has many stages in the longitudinal direction, the opposite outer magnetic ring and inner magnetic ring of each stage can also be provided with opposite pole alignment, so that a longitudinal section corresponding to FIG. 2 through the arrangement of each stage results in a magnetic quadrupole field. The other measures outlined according to the invention can be used in a corresponding way in such an arrangement. The drift current curves run in the same direction, in a plane at right angles to the longitudinal direction, differing from FIG. 3.

The above features and those specified in the claims can advantageously be implemented both individually and in various combinations. The invention is not restricted to the exemplary embodiments described, but can be modified in many ways within the context of specialist knowledge. In particular, strict symmetry about the axis of symmetry SA is not absolutely necessary. Instead, a specific asymmetry can be superimposed on the symmetric course. The annular shape of fields, electrodes or magnet arrangements does not necessarily signify a circularly cylindrical shape, but can also deviate from one such both with regard to the rotational symmetry and with regard to the cylindrical course in the longitudinal direction.

What is claimed is:
1. A plasma accelerator arrangement having a cathode, an anode and a plasma chamber arranged between cathode and anode and having an ionizable gas, the ionization chamber being formed substantially annularly around a central longitudinal axis and a magnetic system having an outer and an inner magnetic arrangement, which are separated radially by the plasma chamber and each on its own in the longitudinal direction has at least one pole change in the longitudinal direction, the pole changes in the longitudinal direction taking place in the same direction for both magnet arrangements.

2. The arrangement as claimed in claim 1, characterized in that the magnetic poles of at least one, preferably both magnet arrangements, are located in the area of the longitudinal extent of the plasma chamber.

3. The arrangement as claimed in claim 1, characterized in that an electrode arrangement is provided on at least one side wall of the plasma chamber, and is electrically connected to an intermediate potential between the potentials of cathode and anode.

4. The arrangement as claimed in claim 3, characterized in that the electrode arrangement comprises at least two part electrodes arranged on opposite side walls of the plasma chamber.

5. The arrangement as claimed in claim 3, characterized in that the electrodes are located in the longitudinal direction between the magnetic poles of the magnet arrangements.

6. The arrangement as claimed in one of claim 1, characterized in that a plurality of magnet arrangements following one another in the longitudinal direction are provided with an alternating pole alignment.

7. The arrangement as claimed in claim 6, characterized in that a plurality of intermediate electrodes following one another in the longitudinal direction and connected to stepped intermediate potentials are arranged on the side walls of the plasma chamber.

8. The arrangement as claimed in claim 7, characterized in that at least some of the intermediate electrodes in the longitudinal direction partially or completely cover pole points of successive magnet arrangements.

* * * * *

UNITED STATES PATENT AND TRADEMARK OFFICE
CERTIFICATE OF CORRECTION

PATENT NO. : 6,803,705 B2
DATED : October 12, 2004
INVENTOR(S) : Kornfeld et al.

It is certified that error appears in the above-identified patent and that said Letters Patent is hereby corrected as shown below:

<u>Title page,</u>
Item [30], Foreign Application Priority Data, add as follows:

-- Mar. 22, 2000    (DE) ..........100 14 033.5 --.

Signed and Sealed this

Third Day of May, 2005

JON W. DUDAS
*Director of the United States Patent and Trademark Office*